United States Patent
Honda et al.

(10) Patent No.: US 9,856,880 B2
(45) Date of Patent: Jan. 2, 2018

(54) MOTOR AND BLOWER

(71) Applicant: Nidec Corporation, Kyoto (JP)

(72) Inventors: Takeshi Honda, Kyoto (JP); Tadaaki Fujinaga, Kyoto (JP); Haruki Yoshimatsu, Kyoto (JP)

(73) Assignee: Nidec Corporation, Kyoto (JP)

(*) Notice: Subject to any disclaimer, the term of this patent is extended or adjusted under 35 U.S.C. 154(b) by 402 days.

(21) Appl. No.: 14/557,636

(22) Filed: Dec. 2, 2014

(65) Prior Publication Data

US 2015/0326092 A1    Nov. 12, 2015

(30) Foreign Application Priority Data

May 7, 2014  (JP) ................... 2014-096358

(51) Int. Cl.
*F04D 25/06* (2006.01)
*H02K 5/16* (2006.01)
(Continued)

(52) U.S. Cl.
CPC ....... *F04D 25/0646* (2013.01); *F04D 25/062* (2013.01); *H02K 5/16* (2013.01); *H02K 5/1675* (2013.01); *H02K 5/173* (2013.01); *H02K 15/14* (2013.01); *B29C 2045/0027* (2013.01); *F04D 17/08* (2013.01); *F04D 17/16* (2013.01); *F04D 25/08* (2013.01); *F05D 2230/21* (2013.01);*F05D 2300/44* (2013.01); *F16C 35/02* (2013.01); *H02K 1/187* (2013.01); *H02K 15/12* (2013.01)

(58) Field of Classification Search
CPC .......... H02K 7/14; H02K 5/16–5/1737; F04D 25/062–25/0646; F04D 13/0633; F04D 13/0673; F04D 19/002; F04D 25/0613; F04D 25/08–25/082

USPC .......... 417/423.7, 356, 363, 423.12, 423.14, 417/423.15, 424.1
See application file for complete search history.

(56) References Cited

U.S. PATENT DOCUMENTS 6,525,441 B2    2/2003    Yamaguchi
7,023,116 B2    4/2006    Kuribara
(Continued)

FOREIGN PATENT DOCUMENTS

JP    07-036586 U    7/1995
JP    11-215763 A    8/1999
(Continued)

OTHER PUBLICATIONS

Honda et al., "Casing and Blower," U.S. Appl. No. 14/557,633, filed Dec. 2, 2014.

*Primary Examiner* — Alexander Comley
(74) *Attorney, Agent, or Firm* — Keating & Bennett, LLP

(57) ABSTRACT

A motor includes a metal base plate and a resin holder extending upward from the base plate. The base plate includes a flat plate portion, a through hole passing through the flat plate portion, and a plurality of claw portions extending upward from an edge of the flat plate portion which includes the through hole. A portion of the holder is in the through hole. The holder covers a portion of each claw portion. The holder is thus engaged with each claw portion to prevent the holder from turning around a rotation axis and from coming off in an upward direction. The holder includes a gate mark near a lower surface of the flat plate portion and at a circumferential position between adjacent ones of the claw portions to make it easier for the resin to fill a cavity inside molds during a molding process.

19 Claims, 9 Drawing Sheets

(51) Int. Cl.
    *H02K 5/173*     (2006.01)
    *H02K 5/167*     (2006.01)
    *H02K 5/14*     (2006.01)
    *H02K 15/14*     (2006.01)
    *F04D 17/08*     (2006.01)
    *F04D 25/08*     (2006.01)
    *F04D 17/16*     (2006.01)
    *H02K 1/18*     (2006.01)
    *H02K 15/12*     (2006.01)
    *B29C 45/00*     (2006.01)
    *F16C 35/02*     (2006.01)

(56) References Cited

U.S. PATENT DOCUMENTS

2008/0011551 A1*   1/2008   Inazuka .............. B29C 45/0055
                                                                                 184/54
2009/0021087 A1*   1/2009   Kitamura ............... H02K 1/187
                                                                                 310/43
2009/0047148 A1    2/2009   Chen et al.
2012/0235526 A1*   9/2012   Wu ...................... H02K 5/1675
                                                                                 310/90

FOREIGN PATENT DOCUMENTS

| JP | 11-215764 A | 8/1999 |
| --- | --- | --- |
| JP | 2000-090527 A | 3/2000 |
| JP | 2002-143767 A | 5/2002 |
| JP | 2002-143768 A | 5/2002 |
| JP | 2002-325413 A | 11/2002 |
| JP | 2003-111316 A | 4/2003 |
| JP | 2004-007999 A | 1/2004 |
| JP | 2004-146056 A | 5/2004 |

* cited by examiner

MOTOR AND BLOWER

BACKGROUND OF THE INVENTION

1. Field of the Invention

The present invention relates to a motor and a blower.

2. Description of the Related Art

Thin blowers have often been installed in electronic devices, such as notebook personal computers, to cool interiors of cases thereof. Such a blower includes a centrifugal impeller, a motor arranged to rotate the impeller, and a casing arranged to accommodate the impeller and the motor. Once the motor of the blower is driven, the impeller is caused to rotate to generate an air current inside an electronic device. Thus, heat which radiates from an electronic component, such as a CPU, installed inside the electronic device is dissipated.

A thin motor of such a blower includes a holder made of a resin and arranged to hold a bearing. The holder may be defined on a small area of a plate defining a bottom surface of the casing by outsert molding. In this case, it is necessary to securely fix the holder made of the resin to the plate.

A technique for increasing the strength with which a plate and a holder made of a resin are fixed to each other in the case where the holder made of the resin is defined on the plate by outsert molding is described, for example, in JP-UM-A H07-036586. According to the technique described in JP-UM-A H07-036586, a plurality of projections are cut and bent upward from a stator base, and a bearing holder made of a resin is defined integrally with the stator base so as to embrace the projections (see, for example, claim 1 and FIGS. 1, 2, and 3 of JP-UM-A H07-036586).

As described above, in the case of the thin motor, it is necessary to locate the holder made of the resin on a small area of the plate. In the case where a lower surface of the holder is closed, it is possible to arrange, in a center of the lower surface of the holder, a gate through which the resin is injected when the outsert molding is performed. This enables the resin to smoothly flow into a mold. According to a structure described in JP-UM-A H07-036586, however, a resin injected on a lower side of the stator base needs to flow to a space on an upper side of the stator base via through holes arranged at positions away from a central axis of the holder. At this time, the projections bent obliquely upward above the through holes interfere with a flow of the resin.

Meanwhile, in the case where the lower surface of the holder is in an annular shape and has an opening in a center thereof, it is impossible to arrange a gate in the center of the lower surface of the holder. In this case, it is more difficult to cause the resin to evenly fill an entire cavity to define the holder, which has a decreased thickness portion.

SUMMARY OF THE INVENTION

A motor according to a first preferred embodiment of the present invention includes a stationary portion, a rotating portion configured to rotate about a rotation axis extending in a vertical direction, and a bearing configured to rotatably support the rotating portion. The stationary portion includes a base plate made of a metal, and a holder made of a resin and extending upward from the base plate. The base plate includes a flat plate portion extending perpendicularly or substantially perpendicularly to the rotation axis; a through hole passing through the flat plate portion; and a plurality of claw portions each of which extends upward from an edge of the flat plate portion which defines the through hole. The claw portions are spaced from one another in a circumferential direction. A portion of the holder is positioned in the through hole. The holder is positioned to cover at least a portion of each claw portion. The holder includes a gate mark being a mark of a gate used in an injection molding process. The gate mark is located near a lower surface of the flat plate portion and at a circumferential position between adjacent ones of the claw portions.

Each of the claw portions preferably extends either obliquely or substantially obliquely upward from the flat plate portion or perpendicularly or substantially perpendicularly upward from the flat plate portion.

A blower according to a preferred embodiment of the present invention includes the motor, an impeller attached to the motor, and a casing configured to accommodate the motor and the impeller therein.

According to the first preferred embodiment of the present invention, the holder is engaged with the claw portions to prevent the holder from turning around the rotation axis and from coming off and upward. In addition, when outsert molding is performed, a gate does not overlap axially with any claw portion, and the resin is therefore able to flow smoothly inside molds.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a rotation axis of a motor is referred to by the term "axial direction", "axial", or "axially", that directions perpendicular to the rotation axis of the motor are referred to by the term "radial direction", "radial", or "radially", and that a direction along a circular arc centered on the rotation axis of the motor is referred to by the term "circumferential direction", "circumferential", or "circumferentially". Note that the term "parallel" as used above and in the following description comprehends both "parallel" and "substantially parallel". Also note that the term "perpendicular" as used above and in the following description comprehends both "perpendicular" and "substantially perpendicular".

It is also assumed herein that an axial direction is a vertical direction, and that a side on which a cover is arranged with respect to a base plate is defined as an upper side. The shape of each member or portion and relative positions of different members or portions will be described based on the above assumptions. It should be noted, however, that the above definitions of the vertical direction and the upper side are not meant to restrict in any way the orientation of a motor according to any preferred embodiment of the present invention when in use.

Figure 1:
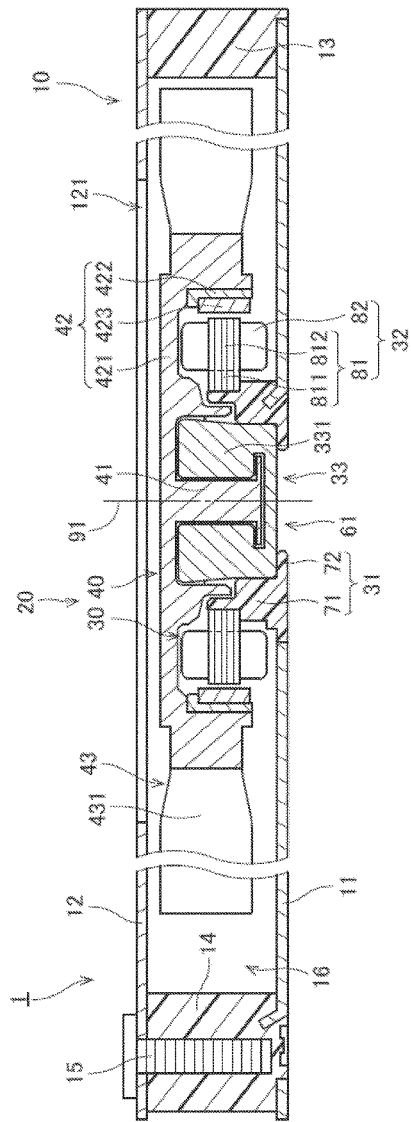
FIG. 1 is a schematic cross-sectional view of a blower according to a preferred embodiment of the present invention.

FIG. 1 is a schematic cross-sectional view of a blower including a motor 20 according to a preferred embodiment of the present invention. The blower 1 is preferably installed in an electronic device, such as, for example, a notebook personal computer or a tablet personal computer, and is used to generate an air current to cool an interior of the electronic device. Note, however, that motors according to preferred embodiments of the present invention may be used to generate an air current for any and all other desirable purposes. Also note that motors according to preferred embodiments of the present invention may be used in applications other than blowers, such as, for example, hard disk drives.

Referring to FIG. 1, the blower 1 according to the present preferred embodiment preferably includes a casing 10, the motor 20, and an impeller portion 43.

The casing 10 is a case configured to accommodate a rotating portion 40 of the motor 20 and the impeller portion 43 therein. The casing 10 preferably includes a base plate 11, a cover 12, a side wall 13, and a support 14. Each of the base plate 11 and the cover 12 is preferably defined by subjecting a flat metal sheet to a stamping process or press working, for example. The base plate 11 is perpendicular to a rotation axis 91. The cover 12 is arranged above the base plate 11 and parallel to the base plate 11. An upper surface of the base plate 11 and a lower surface of the cover 12 are opposed to each other. An aluminum alloy or a galvanized steel sheet, for example, is preferably used as a material of each of the base plate 11 and the cover 12.

The cover 12 includes an air hole 121 through which a gas is taken into the casing 10. The air hole 121 passes through the cover 12 in the vertical direction above the motor 20 and the impeller portion 43. Moreover, the air hole 121 is circular or substantially circular in a plan view, and is coaxial or substantially coaxial with the rotation axis 91 of the motor 20.

Each of the side wall 13 and the support 14 is preferably defined on the base plate 11 by a resin injection molding process. The side wall 13 extends upward from the base plate 11 and also along an edge portion of the base plate 11. The support 14 extends upward from the base plate 11 in the vicinity of the edge portion of the base plate 11. An upper surface of each of the side wall 13 and the support 14 is in contact with the lower surface of the cover 12. In addition, the cover 12 is fixed to the support 14 through a fastener such as, for example, a screw 15.

The motor 20 is configured to produce a torque in accordance with drive currents to rotate the impeller portion 43. The motor 20 preferably includes a stationary portion 30, the rotating portion 40, and a stationary bearing portion 33. The stationary portion 30 is stationary relative to the casing 10. The rotating portion 40 is supported by the stationary bearing portion 33 so as to be rotatable with respect to the stationary portion 30.

The stationary portion 30 according to the present preferred embodiment preferably includes the base plate 11, a holder 31, and a stator 32. The base plate 11 is a portion of the casing 10 as well as a portion of the stationary portion 30 of the motor 20.

The holder 31 is preferably defined on the base plate by a resin injection molding process. The base plate 11 includes a through hole 61 coaxial or substantially coaxial with the rotation axis 91. The holder 31 preferably includes a tubular portion 71 extending upward from a vicinity of an edge portion of the base plate 11 which defines the through hole 61, and a bottom plate portion 72 extending in an annular shape in the through hole 61. Both the tubular portion 71 and the bottom plate portion 72 annularly surround the rotation axis 91.

The stator 32 preferably includes a stator core 81 and a plurality of coils 82. The stator core 81 is defined, for example, by laminated steel sheets. The stator core 81 includes an annular core back 811 and a plurality of teeth 812. The core back 811 is fixed to an outer circumferential surface of the tubular portion 71 of the holder 31 through, for example, an adhesive. The teeth 812 extend radially outward from the core back 811 in a radial manner. Each coil 82 is preferably defined by a conducting wire wound around a separate one of the teeth 812. Both the teeth 812 and the coils 82 are arranged at or substantially at regular intervals in a circumferential direction around the rotation axis 91.

The stationary bearing portion 33 is supported by the holder 31. The stationary bearing portion 33 includes a cylindrical or substantially cylindrical sleeve 331. A portion of a shaft portion 41, which extends in the vertical direction along the rotation axis 91, is accommodated inside the sleeve 331. An inner circumferential surface of the sleeve 331 and an outer circumferential surface of the shaft portion 41 are arranged radially opposite each other with a slight gap intervening therebetween. In addition, a lubricating fluid is arranged in the gap between the inner circumferential surface of the sleeve 331 and the outer circumferential surface of the shaft portion 41. A fluid dynamic bearing is thus defined. The rotating portion 40 is rotatably supported by the stationary bearing portion 33. A polyolester oil or a diester oil, for example, is preferably used as the lubricating fluid. Note, however, that a bearing of any other type, such as, for example, a plain bearing, a sintered bearing, a ball bearing, etc., may be used in place of the fluid dynamic bearing.

The rotating portion 40 according to the present preferred embodiment preferably includes the shaft portion 41, a rotor portion 42, and the impeller portion 43, which is a centrifugal impeller.

The rotor portion 42 preferably includes a rotor holder 421, a yoke 422, and a magnet 423. The rotor holder 421 includes a portion extending radially outward from an upper portion of the shaft portion 41 and a portion located radially outside the stator 32 and extending axially downward so as to assume or substantially assume the shape of a cylinder. The yoke 422 is an annular magnetic body. The yoke 422 is fixed to the rotor holder 421 radially outside the stator 32. The magnet 423 is fixed to an inner circumferential surface of the yoke 422.

The impeller portion 43 includes a plurality of blades 431. Each blade 431 extends radially outward from an outer circumferential surface of the rotor portion 42. The blades 431 are arranged above the base plate 11 and below the cover 12. In addition, the blades 431 are arranged at regular intervals in the circumferential direction.

According to the present preferred embodiment, the shaft portion 41, the rotor portion 42, and the impeller portion are preferably defined integrally with one another as a single monolithic member. Note, however, that any two or more of the shaft portion 41, the rotor portion 42, and the impeller portion 43 may alternatively be defined by separate members. For example, the rotor portion and the shaft portion may be defined by separate members, with the upper portion of the shaft portion fixed in a through hole defined in a center of the rotor portion through, for example, adhesion or press fitting. Also note that each of the shaft portion 41, the rotor portion 42, and the impeller portion 43 may be defined by a plurality of members.

Once the drive currents are supplied to the coils 82 of the stator 32, magnetic flux is generated around each of the teeth 812 of the stator core 81. Then, a circumferential torque is produced by interaction between the magnetic flux of the teeth 812 and that of the magnet 423, so that the rotating portion 40 including the impeller portion 43 is caused to rotate about the rotation axis 91. Rotation of the impeller portion 43 causes gas to be taken from a space above the casing 10 into the casing 10 through the air hole 121. In addition, the gas taken into the casing 10 receives a centrifugal force caused by the impeller portion 43, and is discharged laterally out of the casing 10 through an air channel 16 inside the casing 10.

Figure 2:
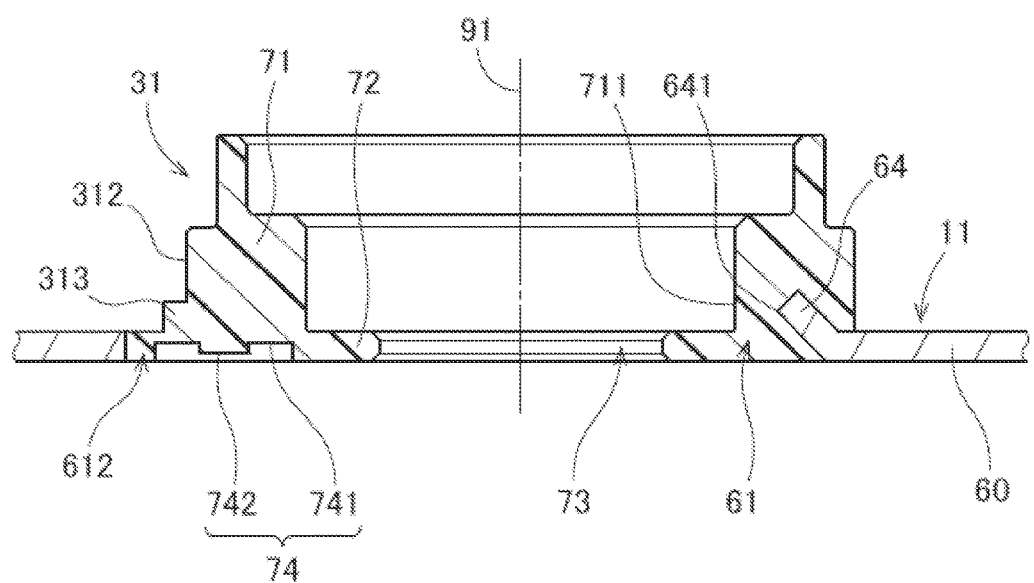
FIG. 2 is a schematic cross-sectional view of a base plate and a holder according to the preferred embodiment shown in FIG. 1, illustrating the holder and its vicinity.
Figure 3:
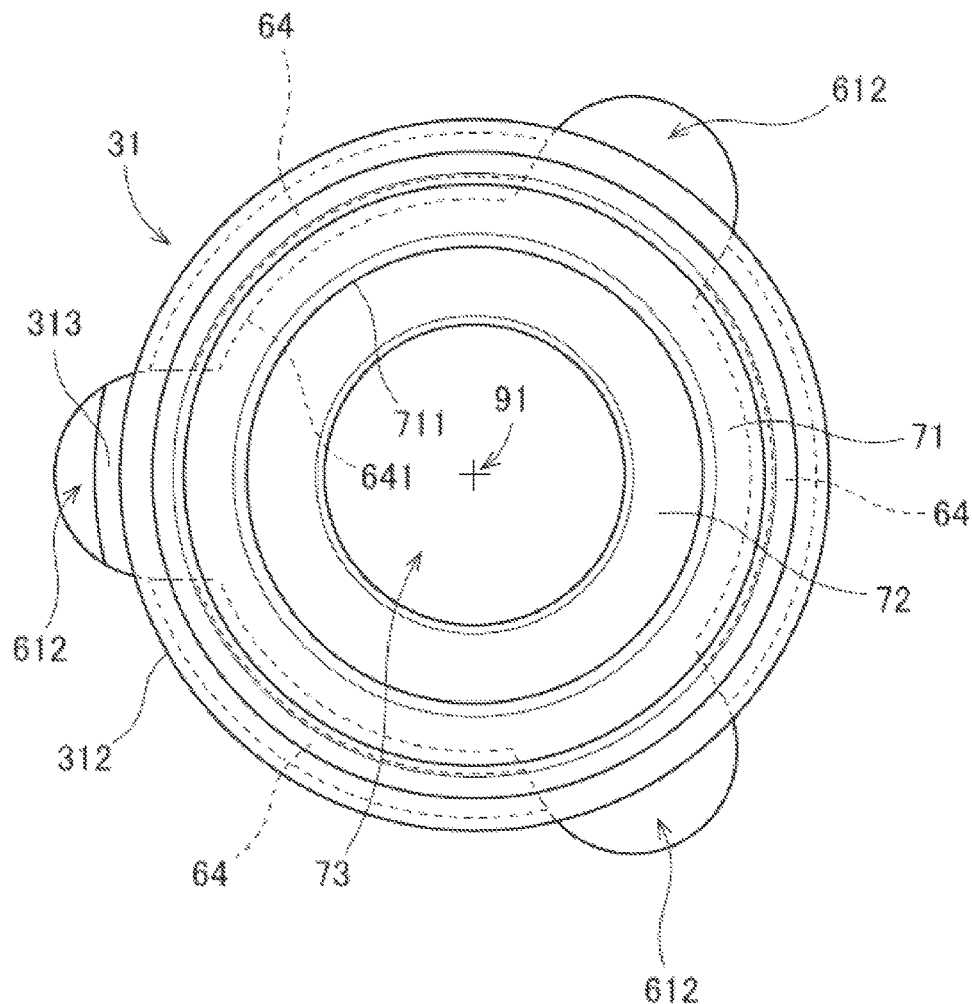
FIG. 3 is a schematic top view of the base plate and the holder, illustrating the holder and its vicinity.
Figure 4:
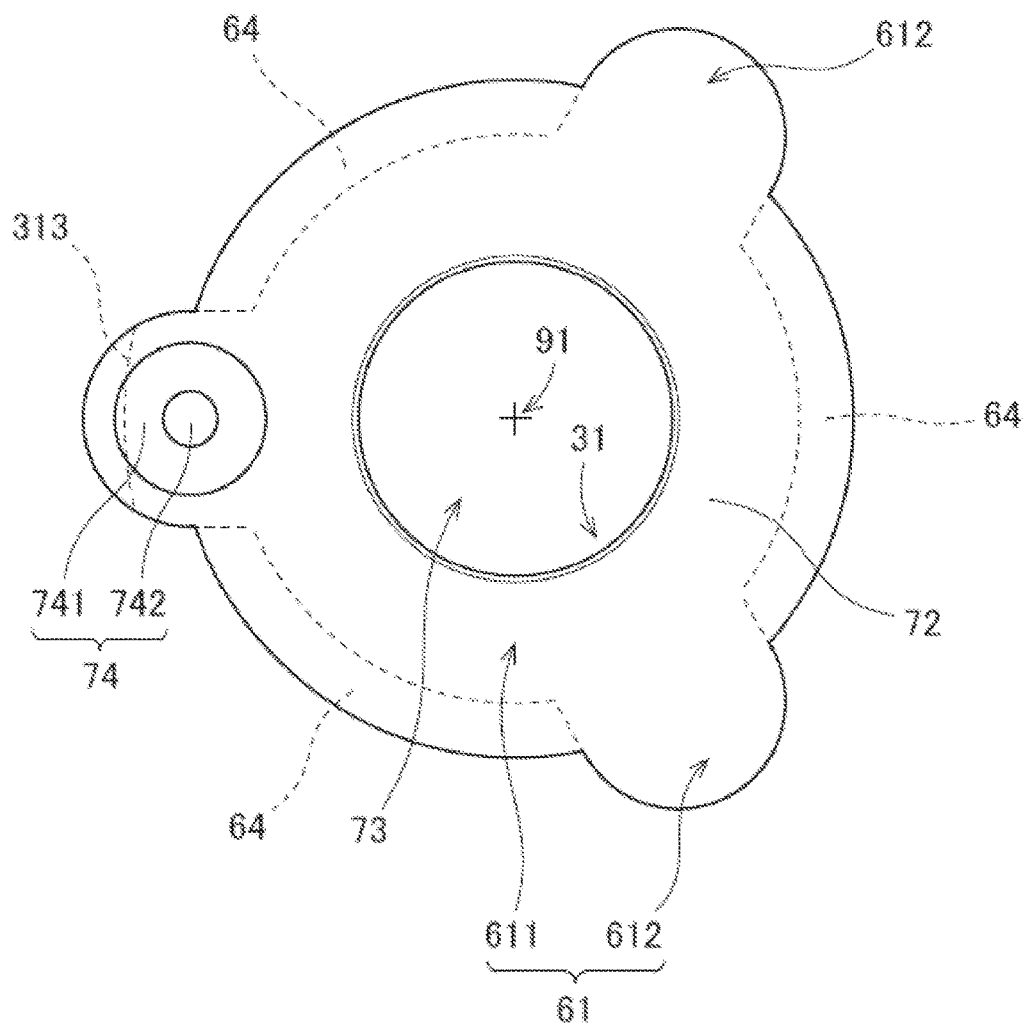
FIG. 4 is a schematic bottom view of the base plate and the holder, illustrating the holder and its vicinity.
Figure 5:
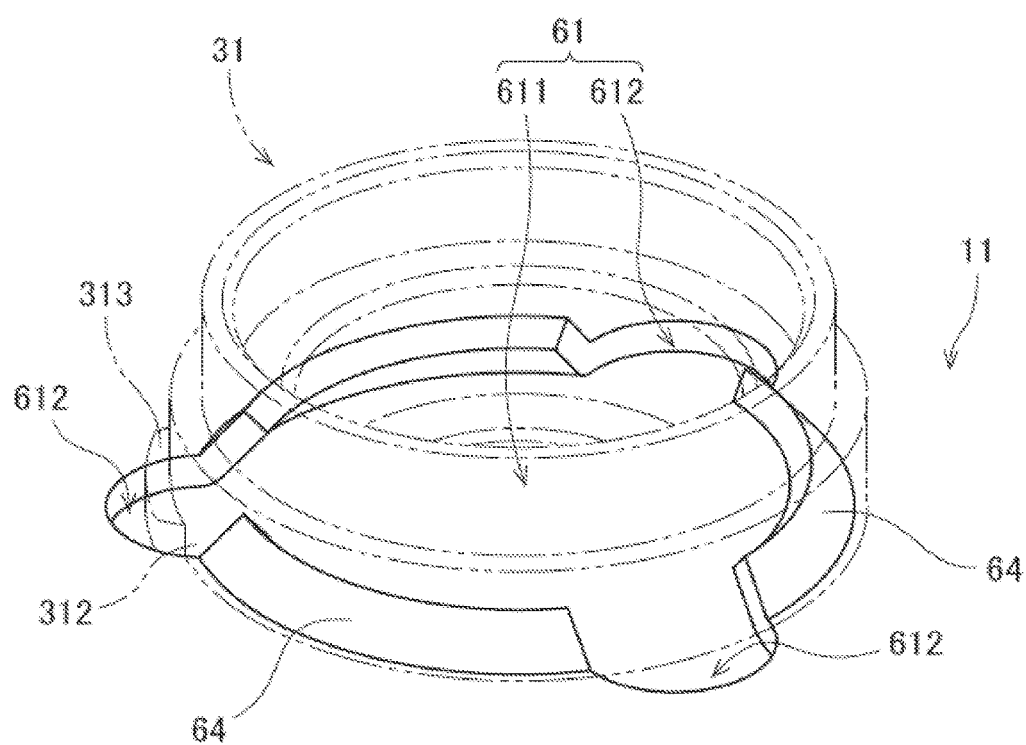
FIG. 5 is a schematic perspective view of the base plate, illustrating the holder and its vicinity.

Next, the structure of the holder 31 and its vicinity will now be described in more detail below. FIG. 2 is a schematic cross-sectional view of the base plate 11 and the holder 31, illustrating the holder 31 and its vicinity. FIG. 3 is a schematic top view of the base plate 11 and the holder 31, illustrating the holder 31 and its vicinity. FIG. 4 is a schematic bottom view of the base plate 11 and the holder 31, illustrating the holder 31 and its vicinity. FIG. 5 is a schematic perspective view of the base plate 11, illustrating the holder 31 and its vicinity. Note that, in FIG. 5, the shape of the holder 31 is represented by chain double-dashed lines.

Referring to FIGS. 2 to 5, the base plate 11 according to the present preferred embodiment preferably includes a flat plate portion 60, the through hole 61, and three claw portions 64. The flat plate portion 60 extends perpendicularly to the rotation axis 91. The through hole 61 passes through the flat plate portion 60 in the axial direction. The through hole 61 according to the present preferred embodiment includes a circular or substantially circular central hole 611 centered on the rotation axis 91, and three cuts 612 each of which is recessed radially outward from an outer end of the central hole 611. The three cuts 612 are positioned at even angular intervals in the circumferential direction. Therefore, as illustrated in FIG. 4, the through hole 61 according to the present preferred embodiment has rotational symmetry (specifically, three-fold rotational symmetry) about the rotation axis 91 in a plan view.

Each of the three claw portions 64 extends, from an annular edge of the flat plate portion 60 which defines the through hole 61, obliquely upward with respect to the flat plate portion 60 and toward the through hole 61. When the base plate is manufactured, three metal pieces, each of which extends from the edge of the flat plate portion 60 toward the rotation axis 91, are preferably bent upward through plastic deformation, such as, for example, press working. Then, the metal pieces being bent upward become the claw portions 64. The three claw portions 64 are arranged at even angular intervals in the circumferential direction. In addition, the claw portions 64 and the cuts 612 are arranged alternately in the circumferential direction.

Each of the three cuts 612 is recessed radially outward relative to a base portion of each claw portion 64, and passes through the flat plate portion 60 in the axial direction. Provision of the cuts 612 between each pair of adjacent claw portions 64 reduces the likelihood that the base plate 11 will be deformed in the vicinity of the base portion of each claw portion 64 when the claw portion 64 is bent upward from the flat plate portion 60.

As described above, the holder 31 includes the tubular portion 71. The tubular portion 71 is arranged at an axial level higher than an axial level of the flat plate portion 60 of the base plate 11. The tubular portion 71 extends in the axial direction around the rotation axis 91 to assume or substantially assume the shape of a cylinder. In addition, the bottom plate portion 72 is located at a lower portion of the holder 31. At least a portion of the bottom plate portion 72 is positioned in the through hole 61 of the base plate 11. The bottom plate portion 72 annularly surrounds the rotation axis 91, and extends perpendicularly to the rotation axis 91.

A lower surface of the stationary bearing portion 33 is arranged at an axial level higher than an axial level of the bottom plate portion 72. The lower surface of the stationary bearing portion 33 is preferably in contact with an upper surface of the bottom plate portion 72. The stationary bearing portion 33 is thus axially positioned with respect to the holder 31. In addition, the bottom plate portion 72 of the holder 31 includes an opening portion 73 in a center thereof. The opening portion 73 is arranged below the stationary bearing portion 33 and inside the through hole 61, and passes through the bottom plate portion 72 in the axial direction.

An adhesive is preferably arranged between the holder 31 and the stationary bearing portion 33 when the holder 31 and the stationary bearing portion 33 are fixed to each other. Specifically, the adhesive is first applied to an inner circumferential surface of the holder 31. Then, the stationary bearing portion 33 is inserted inside the holder 31. At this time, a portion of the adhesive is pushed downward. Then, the portion of the adhesive pushed downward protrudes into the opening portion 73 after passing through a gap between the lower surface of the stationary bearing portion 33 and the upper surface of the bottom plate portion 72. Thereafter, the portion of the adhesive protruding into the opening portion 73 is subjected to a curing process, which is preferably performed from below the holder 31, and examples of which include ultraviolet irradiation, heating with a warm current of air, etc. Thus, in the case where the opening portion 73 is defined in the holder 31, adhesion between the holder 31 and the stationary bearing portion 33 and curing of the adhesive can be easily accomplished.

The holder 31 is preferably obtained by so-called outsert molding. Specifically, a resin is injected into a cavity defined by the base plate 11 and a mold, and is then cured to define the holder 31. When the outsert molding is performed, a portion of the resin which forms the holder 31 flows into each cut 612 of the through hole 61. As a result, a portion of the molded holder 31 is arranged in each cut 612. Since a portion of the holder 31 is arranged in each cut 612 as described above, even if a force acting in a circumferential direction about the rotation axis 91 is exerted on the holder 31, contact between the portion of the holder 31 with a side wall of the base plate 11 which defines the cut 612 acts to prevent the holder 31 from turning around the rotation axis 91.

In addition, the three claw portions 64 of the base plate 11 are covered with the resin which defines the holder 31. Therefore, the resin is in contact with both circumferential end portions of each claw portion 64. This contributes to more effectively preventing the holder 31 from turning around the rotation axis 91.

While the motor 20 is running, a load acting in a rotation direction about the rotation axis 91 is exerted on the holder 31 due to a magnetic attraction force and a magnetic repulsive force produced between the stator 32 and the magnet 44. However, the holder 31 according to the present preferred embodiment is engaged with the cuts 612 and the three claw portions 64 as described above. The strength with which the holder 31 is fixed to the base plate 11 in the rotation direction is thus increased. As a result, the holder 31 is prevented from turning.

In addition, a portion of the resin which defines the holder 31 is arranged below each of the three claw portions 64. Accordingly, the resin is in contact with a surface of each claw portion 64 which faces obliquely downward. Therefore, even if an axially upward force is exerted on the holder 31, contact between a portion of the holder 31 and the surface of each claw portion 64 which faces obliquely downward prevents the holder 31 from coming off axially upward. As described above, each claw portion 64 according to the present preferred embodiment is configured to provide both a function of preventing the holder 31 from turning around the rotation axis 91, and a function of preventing the holder 31 from coming off axially upward.

In particular, each of the three claw portions 64 according to the present preferred embodiment is bent obliquely, but not perpendicularly, upward from the annular edge of the flat plate portion 60 which defines the through hole 61. In this case, a portion of the resin which defines the holder 31 is arranged below each claw portion 64 even when the shape of the claw portion 64 itself does not have an uneven portion. Thus, it is possible to prevent the holder 31 from coming off axially upward without complicating the shape of each claw portion 64.

An angle θ at which each claw portion 64 is bent upward with respect to the flat plate portion 60 is any angle greater than 0 degrees and smaller than 90 degrees. Note, however, that the closer the angle θ is to 90 degrees, the less effectively the holder 31 is prevented from coming off axially upward. Meanwhile, if the angle θ is too small, each claw portion 64 will occupy too large an area in the plan view. In order to prevent the holder 31 from coming off using a small space, the angle θ is preferably greater than about 30 degrees and smaller than about 60 degrees, for example. More preferably, the angle θ is greater than about 40 degrees and smaller than about 50 degrees, for example.

The tubular portion 71 of the holder 31 preferably includes a cylindrical inner circumferential surface 711 surrounding the rotation axis 91. In addition, a top portion 641 of each claw portion 64, which is a radially inner end portion of each claw portion 64, radially overlaps with the inner circumferential surface 711 of the tubular portion 71. In addition, referring to FIGS. 3 to 5, the top portion 641 of each claw portion 64 is preferably in the shape of a circular arc, and is concentric or substantially concentric with the inner circumferential surface 711 of the tubular portion 71. This enables the top portion 641 of each claw portion 64 to have a large circumferential dimension while preventing the top portion 641 of the claw portion 64 from protruding radially inward or radially outward out of the holder 31. This contributes to increasing the area of contact between each claw portion 64 and the holder 31 while reducing the radial thickness of the tubular portion 71. This in turn enables each claw portion 64 to more effectively prevent the turning and the coming off of the holder 31.

Further, according to the present preferred embodiment, not only the top portion 641 of each claw portion 64, but each of the entire claw portions 64 is in the shape of a circular arc and is coaxial or substantially coaxial with the inner circumferential surface 711 of the tubular portion 71. This enables each of the entire claw portions 64 to have a large circumferential dimension while preferably preventing each of the entire claw portions 64 from protruding radially inward or radially outward out of the holder 31. This in turn contributes to further increasing the area of contact between each claw portion 64 and the holder 31 while reducing the radial thickness of the tubular portion 71. This in turn preferably enables each claw portion 64 to more effectively prevent any turning and coming off of the holder 31.

Figure 6:
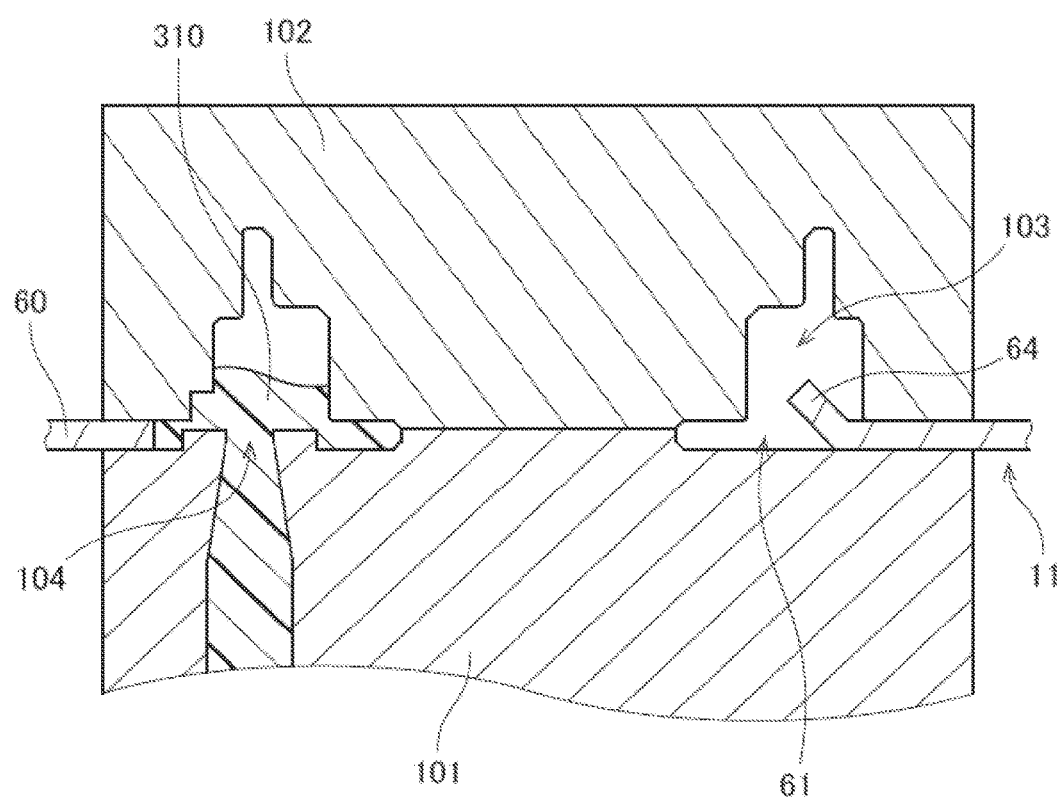
FIG. 6 is a schematic diagram illustrating how the holder is molded by outsert molding according to a preferred embodiment of the present invention.

FIG. 6 is a schematic diagram illustrating how the holder 31 is molded by the outsert molding in accordance with a preferred embodiment of the present invention. When the holder is produced by the outsert molding, a fixed mold 101, a movable mold 102, and the base plate 11 are first prepared. The through hole 61 and the three claw portions 64 are previously defined in the base plate 11 by press working or the like.

Next, the base plate 11 is placed on the fixed mold 101, and the movable mold 102 is brought into contact with the upper surface of the base plate 11. The fixed mold 101 and the movable mold 102 are arranged one above the other with the through hole 61 of the base plate 11 arranged therebetween. As a result, a cavity 103, i.e., a closed interior space, is preferably defined by the fixed mold 101, the movable mold 102, and the base plate 11.

Next, a molten resin 310 is injected into the cavity 103. The molten resin 310 is injected into the cavity 103 through a gate 104 defined in the fixed mold 101. A mouth of the gate 104 is preferably located in the through hole 61 of the base plate 11. The injected molten resin spreads upward from the through hole 61, and fills the entire cavity 103.

After the molten resin 310 fills the cavity 103, the molten resin 310 is cooled and cured. The molten resin 310 in the cavity 103 is cured to become the holder 31. In addition, the base plate 11 and the holder 31 are fixed to each other at the same time as the molten resin 310 is cured. Thereafter, the resin inside the gate 104 is cut off, and the movable mold 102 is moved upward to separate the fixed mold 101 and the movable mold 102 from each other. Then, the base plate 11 and the holder 31 are released from the movable mold 102.

Referring to FIG. 2, the lower surface of the holder 31 after being molded is located in the through hole 61 of the base plate 11. In addition, referring to FIGS. 2 and 4, the lower surface of the holder 31 preferably includes a gate mark 74, which is a mark of the gate 104 used in the injection molding process. The gate mark 74 preferably includes an annular recessed portion 741 and a cut-off mark 742 arranged inside of the recessed portion 741. Each of the recessed portion 741 and the cut-off mark 742 is arranged at an axial level higher than an axial level of a lower surface of the flat plate portion 60 of the base plate 11. Accordingly, the resin preferably does not protrude below the lower surface of the flat plate portion 60.

In addition, referring to FIG. 4, the gate mark 74 is located near the lower surface of the flat plate portion 60 and at a circumferential position between adjacent ones of the claw portions 64. Accordingly, no claw portion 64 axially overlaps with the gate mark 74. That is, no claw portion 64 axially overlaps with the gate 104 when the outsert molding is performed.

This prevents a flow of the molten resin 310 injected through the gate 104 from being blocked by any claw portion 64. This makes it easier for the molten resin 310 to fill the cavity 103.

In addition, the holder 31 according to the present preferred embodiment preferably includes only one gate mark 74. Moreover, a portion of the gate mark 74 is preferably arranged in one of the three cuts 612. Use of a space inside the cut 612 contributes to increasing the diameter of an opening of the gate 104 used in the outsert molding. This in turn contributes to reducing the number of gates 104, that is, the number of gate marks 74.

Further, the holder 31 according to the present preferred embodiment preferably includes a projecting portion 313 in a radially outward "circumferential surface portion" 312 thereof. The projecting portion 313 projects radially outward or axially upward relative to a remaining portions of the circumferential surface portion 312 of the holder 31. In addition, the projecting portion 313 preferably axially overlaps with at least a portion of the gate mark 74. When the outsert molding is performed, a space corresponding to the projecting portion 313 is included in the cavity 103. Therefore, a wide space is secured in a direction toward which the molten resin 310 is injected. This improves smoothness with which the molten resin 310 flows, and enables the molten resin 310 to more efficiently fill the cavity 103.

While preferred embodiments of the present invention have been described above, the present invention is not limited to the above-described preferred embodiments.

Figure 7:
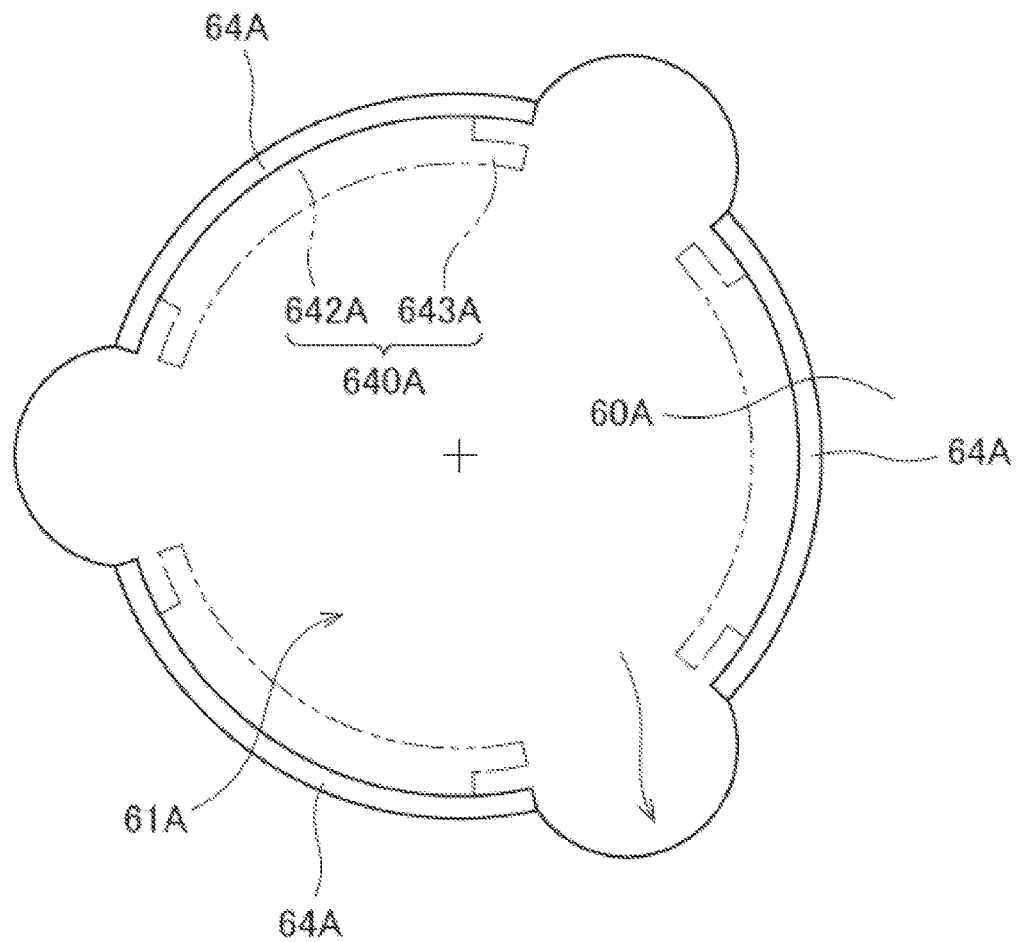
FIG. 7 is a schematic top view of a portion of a base plate according to an example modification of a preferred embodiment of the present invention, illustrating a through hole of the base plate and its vicinity.

FIG. 7 is a schematic top view of a portion of a base plate according to an example modification of a preferred embodiment of the present invention, illustrating a through hole 61A of the base plate and its vicinity. In the modification illustrated in FIG. 7, three claw portions 64A are preferably defined by bending metal pieces 640A extending from an annular edge of a flat plate portion 60A which defines the through hole 61A toward the through hole 61A perpendicularly upward. Accordingly, each of the three claw portions 64A illustrated in FIG. 7 extends axially upward and perpendicularly to the flat plate portion 60A. A further reduction in an area occupied by each claw portion 64A in a plan view is achieved by bending the claw portion 64A perpendicularly upward as described above. This makes it possible to cope with the case where each claw portion 64A is permitted to occupy a smaller space.

In addition, according to the modification illustrated in FIG. 7, each of the metal pieces 640A, which become the claw portions 64A, preferably includes a decreased width portion 642A and an increased width portion 643A. After the claw portion 64A is bent upward, the increased width portion 643A is located at an axial level higher than an axial level of the decreased width portion 642A. Assuming that the circumferential width of the decreased width portion 642A is a first width, and that the circumferential width of the increased width portion 643A is a second width, the second width is greater than the first width. With this arrangement, a portion of a resin which defines a holder is located below a portion of the increased width portion 643A which projects relative to the decreased width portion 642A after the metal pieces 640A are bent upward and the outsert molding is performed. The holder is thus prevented from coming off and upward.

In the case where each claw portion includes the decreased width portion and the increased width portion as described above, an upward coming off of the holder is prevented even when the claw portion is bent perpendicularly upward. Each of the claw portions 64A illustrated in FIG. 7 preferably has a double-wing shape, with the increased width portion 643A projecting circumferentially in both directions relative to the decreased width portion 642A. Note, however, that a claw portion according to another preferred embodiment of the present invention may have a single-wing shape, with an increased width portion thereof projecting circumferentially in only one direction relative to a decreased width portion thereof. Also note that the increased width portion may not necessarily be in the vicinity of the top portion of the claw portion. Also note that a claw portion according to another preferred embodiment of the present invention may include two or more decreased width portions or two or more increased width portions. Also note that a claw portion according to another preferred embodiment of the present invention may be bent obliquely upward and include a decreased width portion and an increased width portion as described above.

Figure 8:
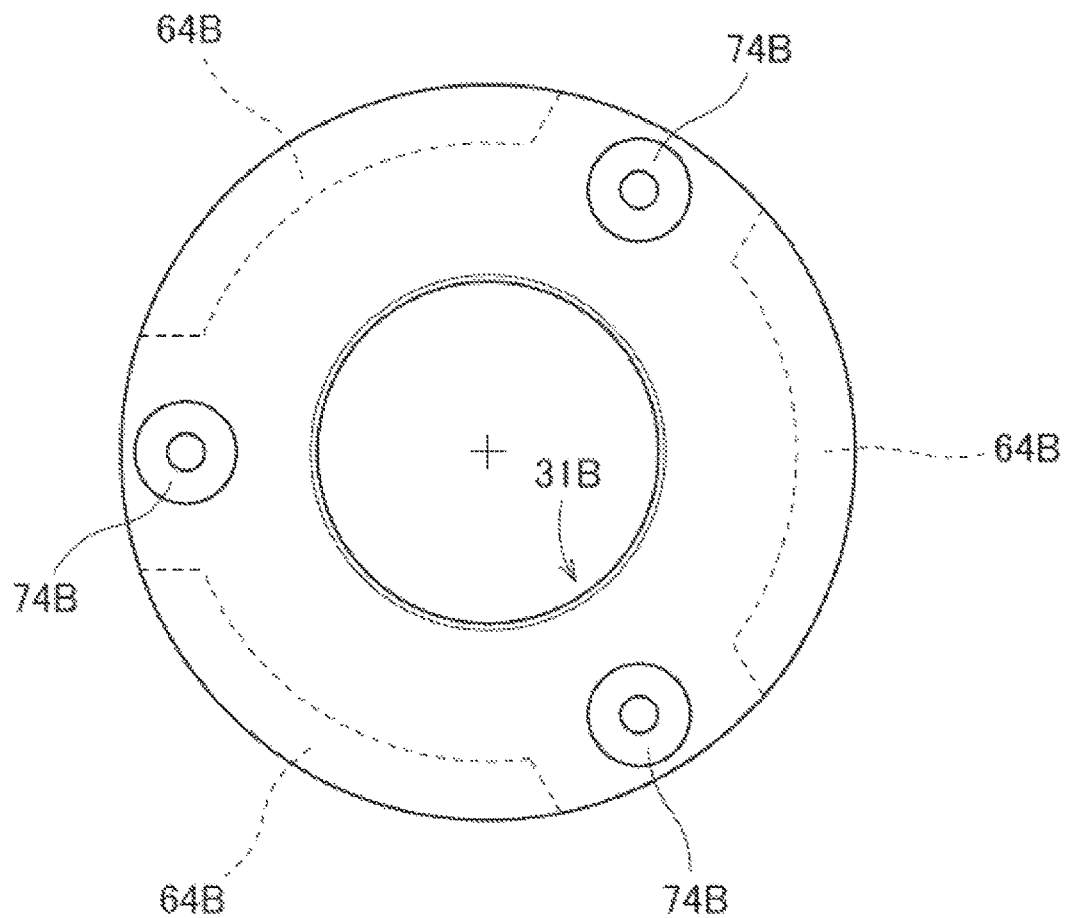
FIG. 8 is a schematic bottom view of a base plate and a holder according to an example modification of a preferred embodiment of the present invention.

FIG. 8 is a schematic bottom view of a base plate and a holder 31B according to another example modification of a preferred embodiment of the present invention. In the modification illustrated in FIG. 8, no cuts are arranged between adjacent claw portions 64B. In addition, three gate marks 74B are each preferably positioned at a circumferential position between adjacent ones of the claw portions 64B. The diameter of an opening of each gate mark 74B is smaller than the diameter of an opening of the gate mark 74 according to the above-described preferred embodiment. In the modification illustrated in FIG. 8, no claw portion 64B axially overlaps with any gate mark 74B. This makes it easier for the resin to fill a cavity when outsert molding is performed. The resin may be injected through a plurality of gates as in this modification, in the case where the cuts are not provided and the diameter of the opening of the gate cannot be increased.

Figure 9:
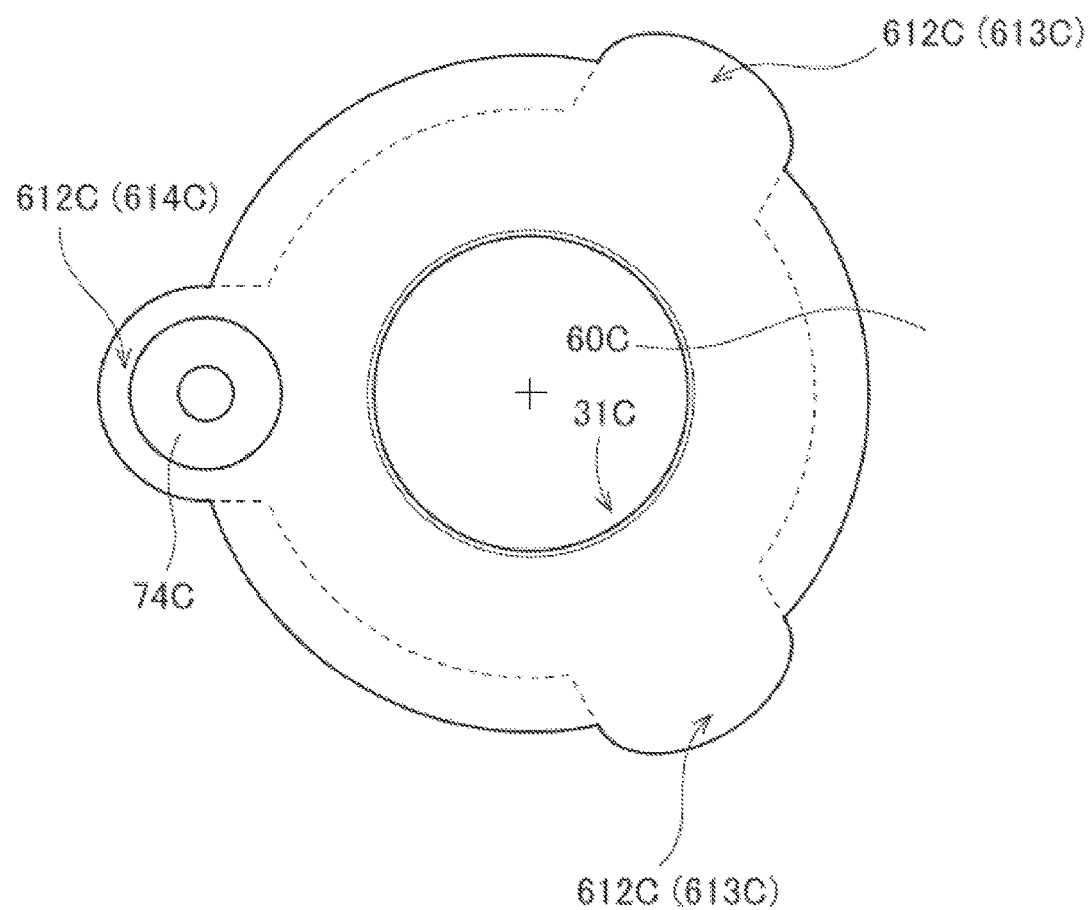
FIG. 9 is a schematic bottom view of a base plate and a holder according to an example modification of a preferred embodiment of the present invention.

FIG. 9 is a schematic bottom view of a base plate and a holder 31C according to yet another example modification of the above-described preferred embodiment. The base plate illustrated in FIG. 9 preferably includes three cuts 612C. The three cuts 612C include two first cuts 613C and one second cut 614C having a radial depth greater than that of each first cut 613C. A portion of a gate mark 74C is located in the second cut 614C. The radial depths of the cuts 612C may be varied such that the cut 612C (614C) in which a portion of the gate mark 74C is located has a radial depth different from that of the cuts 612C (613C) in which no gate mark 74C is located. This contributes to further improving rigidity of a flat plate portion 60C while minimizing the radial depth of each cut 612C.

According to the above-described preferred embodiments and modifications thereof, each of the entire claw portions 64 is preferably buried in the holder 31. Note, however, that a portion of each claw portion may protrude out of the holder. In short, the holder covers at least a portion of each claw portion.

According to the above-described preferred embodiments and modifications thereof, the number of claw portions 64 covered by the holder 31 is preferably three. Note, however, that the number of claw portions covered by the holder may be two or more than three. Also note that the number of cuts arranged between the claw portions may be one, two, or more than three.

According to the above-described preferred embodiments and modifications thereof, preferably only a portion of the gate mark 74 is located in the cut. Note, however, that the entire gate mark may be arranged in the cut.

Also note that the detailed shape of the motor may be different from the shape thereof as illustrated in the accompanying drawings of the present application.

Also note that features of the above-described preferred embodiments and the modifications thereof may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a stationary portion;
    a rotating portion configured to rotate about a rotation axis extending in a vertical direction; and
    a bearing configured to rotatably support the rotating portion; wherein
    the stationary portion includes:
        a base plate made of a metal; and
        a holder made of a resin and extending upward from the base plate;
    the base plate includes:
        a flat plate portion extending perpendicularly or substantially perpendicularly to the rotation axis;
        a through hole passing through the flat plate portion; and
        a plurality of claw portions, each of which extends upward from an edge of the flat plate portion which defines the through hole;
    the claw portions are spaced from one another in a circumferential direction;
    a portion of the holder is located in the through hole;
    the holder covers at least a portion of each claw portion;
    the holder includes a gate mark used in an injection molding process;
    the gate mark is located near a lower surface of the flat plate portion and at a circumferential position between adjacent ones of the claw portions which are opposed to one another in the circumferential direction without any other one of the claw portions provided therebetween; and
    none of the claw portions axially overlap any portion of the gate mark.

2. The motor according to claim 1, wherein the through hole includes at least one cut positioned between adjacent ones of the claw portions, recessed radially outward relative to a base portion of each claw portion, and passing through the base plate in an axial direction.

3. The motor according to claim 2, wherein at least a portion of the gate mark is positioned in a corresponding one of the at least one cut.

4. The motor according to claim 3, wherein
    the at least one cut included in the through hole is two or more in number;
    the gate mark included in the holder is only one in number; and
    at least a portion of the gate mark is positioned in one of the two or more cuts.

5. The motor according to claim 1, wherein
    the holder includes a projecting portion which projects radially outward or axially upward in a circumferential surface portion thereof; and
    the projecting portion and the gate mark axially overlap with each other.

6. The motor according to claim 1, wherein
    the gate mark includes:
        an annular recessed portion; and
        a cut-off mark located inside of the recessed portion; and
    the cut-off mark is arranged at an axial level higher than an axial level of the lower surface of the flat plate portion.

7. The motor according to claim 1, wherein each claw portion extends, from the edge of the flat plate portion which defines the through hole, obliquely or substantially obliquely upward with respect to the flat plate portion and toward the through hole.

8. The motor according to claim 7, wherein
    the holder includes a cylindrical inner circumferential surface surrounding the rotation axis; and
    a top portion of each claw portion radially overlaps with the inner circumferential surface of the holder, is in a shape of a circular or substantially circular arc, and is concentric or substantially concentric with the inner circumferential surface of the holder.

9. The motor according to claim 8, wherein an entirety of each of the claw portions is in a shape of a circular or substantially circular arc, and is coaxial or substantially coaxial with the inner circumferential surface of the holder.

10. The motor according to claim 9, wherein an entirety of each of the claw portions is buried in the holder.

11. The motor according to claim 1, wherein each of the claw portions extends perpendicularly or substantially perpendicularly upward from the edge of the flat plate portion which defines the through hole.

12. The motor according to claim 1, wherein each of the claw portions includes:
    a decreased width portion having a first width; and
    at least one increased width portion having a second width greater than the first width, and positioned axially above the decreased width portion.

13. The motor according to claim 12, wherein an entirety of each of the claw portions is buried in the holder.

14. The motor according to claim 1, wherein
    the holder includes a cylindrical inner circumferential surface surrounding the rotation axis; and
    a top portion of each claw portion radially overlaps with the inner circumferential surface of the holder, is in a shape of a circular or substantially circular arc, and is concentric or substantially concentric with the inner circumferential surface of the holder.

15. The motor according to claim 14, wherein an entirety of each of the claw portions is in a shape of a circular or substantially circular arc, and is coaxial or substantially coaxial with the inner circumferential surface of the holder.

16. The motor according to claim 15, wherein an entirety of each of the claw portions is buried in the holder.

17. The motor according to claim 1, wherein the holder is configured to hold the bearing, includes an opening portion located below the bearing and inside the through hole, and passes through the holder in an axial direction.

18. The motor according to claim 1, wherein
    a lower portion of the holder includes a bottom plate portion extending perpendicularly or substantially perpendicularly to the rotation axis; and
    the bearing is arranged above the bottom plate portion.

19. A blower comprising:
the motor of claim 1;
an impeller attached to the motor; and
a casing configured to accommodate the motor and the impeller therein.

* * * * *